2,442,623

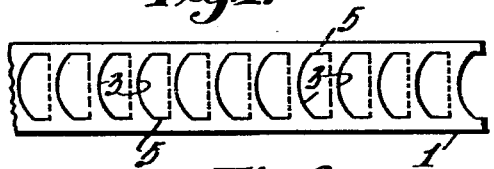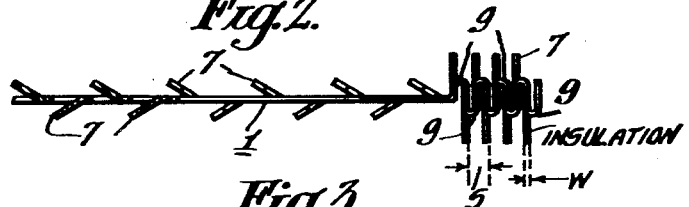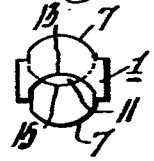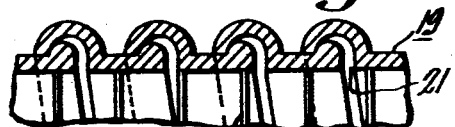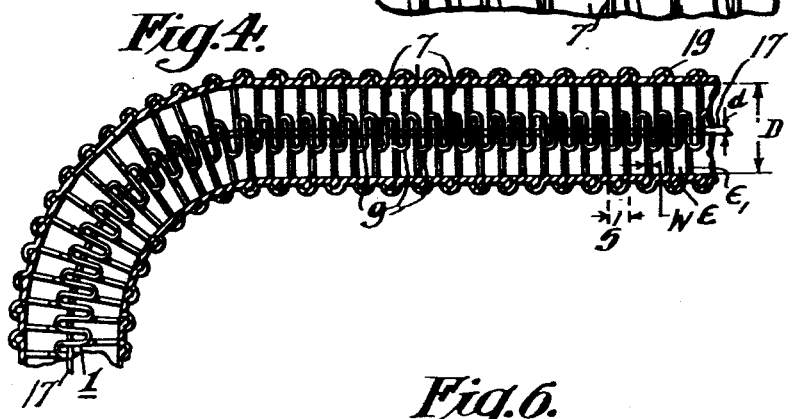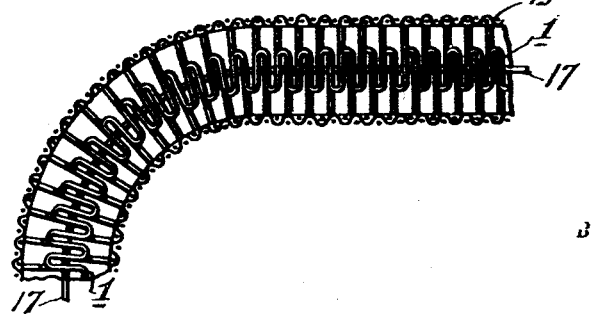
INVENTOR.
George C. Sziklai
ATTORNEY Patented June 1, 1948

UNITED STATES PATENT OFFICE 2,442,623

COAXIAL CABLE

George C. Sziklai, Princeton, N. J., assignor to Radio Corporation of America, a corporation of Delaware Application October 26, 1945, Serial No. 624,780

8 Claims. (Cl. 174—28)

This invention relates generally to coaxial transmission lines and more particularly to improved coaxial cables utilizing a continuous ribbon of dielectric material as a spacer between the inner and outer conductors of the line.

Heretofore, various types of solid dielectric spacers have been employed in coaxial transmission cables to support the inner conductor substantially on the cable axis. Such spacing insulators introduce discontinuities in the line dielectric which tend to provide undesirable wave reflections and absorption. In order to overcome such wave transmission discontinuity, the spacing insulators frequently are especially shaped to minimize wave reflections. However, it frequently is necessary to bend the cable around corners or to provide flexible cable sections. Conventional cable spacing insulators do not lend themselves to curved cable sections or to flexible cables for the reason that the insulators must fit closely within the outer cable conductor and must be individually fastened, cemented or closely fitted to the inner cable conductor to prevent axial displacement of the spacers.

The instant invention comprises an improved solid dielectric spacing insulator for coaxial cables comprising a thin strip of dielectric material having a series of spaced tabs struck out therefrom, the edges of said strip from which the tabs extend defining corresponding windows through which the inner cable conductor is passed. The strip is shaped in the form of corrugated folds intermediate alternate transversely extending tabs whereby the tabs are substantially accurately spaced and maintained at the desired transverse angle with respect to the cable conductors. The transverse tabs are of sufficient length to contact the inner surface of the outer cable conductor. When the cable is bent, or when a flexible section of cable is employed, the transverse tabs at the bend shift longitudinally to follow the radii of the curve in the cable. The axially disposed windows in the dielectric strip support the inner conductor substantially on the cable axis, thereby maintaining substantially constant the cable surge impedance and flash-over voltage limits. The strip may be assembled in the cable in a continuous manner, thus minimizing production time and cost. It also is adaptable to pressurized cables due to clearance at the sides of the tabs. Conventional cable bead separators must be specially formed for this purpose.

Accordingly, it is one of the principal objects of the present invention to provide an improved coaxial transmission cable comprising coaxially disposed inner and outer conductors separated by a flexible dielectric element having transversely disposed supporting tabs which are accurately spaced by intermediate corrugations of the dielectric material. Another object is to provide an improved coaxial transmission line having a dielectric spacing element comprising a substantially continuous strip of dielectric material which is perforated and shaped to provide uniform and accurate support for the cable inner conductor. A further object is to provide an improved coaxial transmission cable having low reflection losses. An additional object is to provide an improved coaxial transmission cable having substantially constant surge impedance and flash-over voltage irrespective of the curvature of the cable axis. Another object is to provide an improved coaxial transmission cable having flexible inner and/or outer conductors separated by a continuous flexible dielectric strip which is perforated and shaped to maintain substantially accurate alignment of the cable conductors.

The invention will be described in greater detail by reference to the accompanying drawing of which Figure 1 is a plan view of a dielectric strip showing one stage in the formation of said strip according to the invention; Figure 2 is a side elevational view of said strip showing succeeding steps in the formation of the cable dielectric element; Figure 3 is a right elevational view of the dielectric element illustrated in Figure 2; Figure 4 is a cross-sectional elevational view of a flexible coaxial cable constructed according to the invention; Figure 5 is an enlarged fragmentary view of the outer conductor of the coaxial cable illustrated in Figure 4; and Figure 6 is an elevational cross-sectional view of a modification of a coaxial cable constructed according to the invention. Similar reference characters are applied to similar elements throughout the drawing.

In accordance with the invention, and referring to Figure 1, a coaxial cable dielectric spacing strip comprises a flat strip of dielectric material having a thickness of the order of .002 inch to .020 inch. It may comprise any low-loss insulator material having high elasticity such as, for example, polystyrene, (polyethylene) "Copolene," etc. The dielectric strip has a width slightly less than the inner diameter of the outer cable conductor. A strip I is slitted, as shown by the heavy lines, at equally spaced points, each slit being constituted of an arcuate portion 3 and parallel lateral portions 5. Preferably, although not necessarily, the arcuate portion 3 comprises a circular arc for accurate engagement with the inner surface of the outer line conductor as will appear in the subsequent description. The slitted strip 1 is then supported on any suitable support member, such as, for example, a block having a series of windows corresponding in shape to the tabs which are formed by the slitted sections of the dielectric strip 1. By means of a suitable tool, the tabs or slitted portions of the dielectric strip are bent out of the plane of the strip, as indicated in the left hand portion of Figure 2, in a manner whereby alternate tabs extend in the same angular direction. The strip 1 with the offset tabs 7 is then folded or corrugated, as indicated in the right hand portion of Figure 2, so that the tabs extend outwardly substantially radially from the corrugated strip. The corrugated portions 9 thereof, are preferably formed so that the tabs 7 on each side of the strip are substantially normal to the axis of the strip. The corrugations 9 thus serve as spacing members between the tabs 7 and provide considerable axial flexibility with substantial transverse rigidity.

As will be seen from Figure 3, the corrugations and apertures adjacent each of the transversely corresponding tabs 7 provide a center window 11 through which the inner conductor of the coaxial cable may be passed. The intersecting arcuate edges 13 and 15 of the window 11 contact the outer surface of the inner conductor 17 of the cable and the peripheral portions of the tabs 7 contact the inner surface of the outer conductor 19, as shown in Figure 4.

Figure 4 illustrates a first embodiment of the invention as applied to a flexible coaxial transmission cable wherein the inner conductor 17 is axially supported within a coaxially disposed flexible outer conductor 19. The outer conductor 19 may comprise, for example, a continuous loosely-interlocked metal spiral as illustrated in the enlarged view of Figure 5. This construction is similar to conventional BX cable sheathing. The gaps 21 between adjacent interlocked spiral sections of the conductor are made sufficiently wide to permit gradual bends in the cable outer conductor. Preferably the cable inner conductor 17 should be of flexible solid material such as phosphor bronze. In order that both inner and outer conductors may have high electrical conductivity, both conductors preferably should be copper or silver plated prior to assembly. When the cable axis is curved, the corrugated dielectric strip 1 shifts axially therein at the bend so that the transverse tabs 7 follow the radii of the cable curvature. The resilience of the dielectric spacer provided by the corrugated portions 9 substantially accurately spaces the transverse dielectric tabs 7 to follow accurately the curvature of the cable axis.

A modification of the flexible cable of Figure 4 is illustrated in Figure 6 wherein the outer cable conductor 19' comprises a braided metal sheath having sufficient rigidity and elasticity to follow the desired cable curvature while retaining substantially circular cable cross-section. Such a braided metallic sheath may comprise a relatively large number of braided steel or phosphor bronze wires which are copper or silver plated, to provide high electrical conductivity.

It should be understood that the outer cable conductor also may be constructed of somewhat rigid material such as copper or brass which will accommodate only gradual bends. Notwithstanding slight flattening of the outer conductor due to curvature thereof, the flexible dielectric spacing element will substantially accurately position the inner conductor at the center of the cable. Due to the complex shape of the corrugated spacing dielectric element 1, objectionable wave reflections from the surface thereof are substantially minimized due to reflection interference and cancellation.

If desired, the transverse dielectric tabs 7 may be bent to an angle of other than 90° with respect to the cable axis in order further to minimize undesirable wave reflections.

The surge impedance of a coaxial line employing a continuous strip corrugated dielectric element of the type described is approximately (1) $$Z_0 = \frac{138}{\sqrt{\epsilon}} \left( \frac{\log_{10} \frac{D}{d}}{\sqrt{\epsilon + \frac{\epsilon_1 - \epsilon}{S} W}} \right)$$

where $\epsilon$ is the dielectric constant of the gaseous dielectric in the line, $\epsilon_1$ is the dielectric constant of the solid dielectric spacer element, D is the inside diameter of the outer cable conductor, $d$ is the outside diameter of the inner cable conductor, S is the axial spacing between adjacent transverse dielectric tabs, and W is the thickness of said solid dielectric element.

Thus the invention disclosed comprises an improved coaxial cable adapted to bent cable or flexible cable sections, as well as to straight cable sections, wherein the coaxially disposed conductors are separated by a continuous dielectric strip formed to provide transverse supporting tabs and intermediate corrugated portions for retaining the coaxial relation of the conductors notwithstanding curvature of the cable axis.

I claim as my invention:

1. A coaxial transmission cable comprising a pair of coaxially disposed inner and outer conductors and a flexible dielectric element disposed between said conductors comprising a strip of dielectric material having a series of spaced tabs struck out therefrom, the edges of said strip from which said tabs extend defining corresponding windows, said strip having folds between alternate tabs so that successive windows overlap to form a central passage for supporting the inner one of said coaxial conductors and said tabs extending transversely to contact said outer one of said coaxial conductors.

2. A flexible coaxial transmission line including coaxially disposed inner and outer flexible conductors, and a flexible dielectric supporting element disposed therebetween comprising a dielectric strip having a series of spaced tabs struck out therefrom, the edges of said strip from which said tabs are struck out defining corresponding windows, successive tabs extending out of the plane of said strip in opposite directions and said strip having folds located between alternate tabs and with the windows overlapping, alternate tabs being spaced apart by the intermediate folds in said strip and said inner conductor passing through and supported by said windows.

3. A flexible coaxial transmission line including coaxially disposed inner and outer conductors and a flexible corrugated dielectric element disposed between said conductors having portions struck out from the body thereof to provide radially extending disc-like members with the edges of the portions of said strip from which said tabs are struck out forming corresponding windows, said strip having corrugations between alternate tabs and said corrugations being such that the said windows overlap to form a longitudinal passage for said inner conductor, and said disc-like members extending radially to contact said outer conductor.

4. A coaxial transmission line including coaxially disposed inner and outer conductors and a flexible dielectric element disposed transversely therebetween comprising a corrugated dielectric strip having integrally struck out tabs extending outwardly therefrom with the edges of said strip from which said tabs are struck out forming corresponding windows, the corrugations in said strip being arranged so that said windows overlap to form a passage for said inner conductor, said tabs extending radially to contact said outer conductor.

5. A coaxial cable according to claim 4 wherein said outer conductor comprises a loosely interlocked metallic spiral.

6. A coaxial cable according to claim 4 wherein said outer conductor comprises flexible metallic braid.

7. A flexible coaxial line according to claim 4 wherein said inner conductor comprises a flexible solid element proportioned to substantially fit said passage formed by said windows.

8. A coaxial transmission line including coaxially disposed inner and outer conductors and a flexible dielectric element disposed transversely therebetween comprising a corrugated dielectric strip having axially disposed windows for supporting said inner conductor and radially disposed tabs interposed between said corrugations and extending transversely to said outer conductor, said line having a surge impedance of the order of $$Z_0 = \frac{138}{\sqrt{\epsilon}} \left( \frac{\log_{10} \frac{D}{d}}{\sqrt{\epsilon + \frac{\epsilon_1 - \epsilon}{S} W}} \right)$$

wherein $\epsilon$ is the dielectric constant of the gaseous dielectric within said line, $\epsilon_1$ is the dielectric constant of the flexible dielectric element, $D$ is the internal diameter of said outer conductor, $d$ is the external diameter of said inner conductor, $W$ is a thickness of said tabs and $S$ is the axial spacing between said tabs.

GEORGE C. SZIKLAI.

REFERENCES CITED

The following references are of record in the file of this patent:

UNITED STATES PATENTS

| Number | Name | Date |
|---|---|---|
| 2,351,927 | Contini | June 20, 1944 |

FOREIGN PATENTS

| Number | Country | Date |
|---|---|---|
| 768,842 | France | May 28, 1934 |